(No Model.)
H. HAGEMANN.
INSTRUMENT FOR TRANSFERRING MEASUREMENTS ACCORDING TO ONE SYSTEM INTO ANOTHER SYSTEM.
No. 426,010. Patented Apr. 22, 1890.
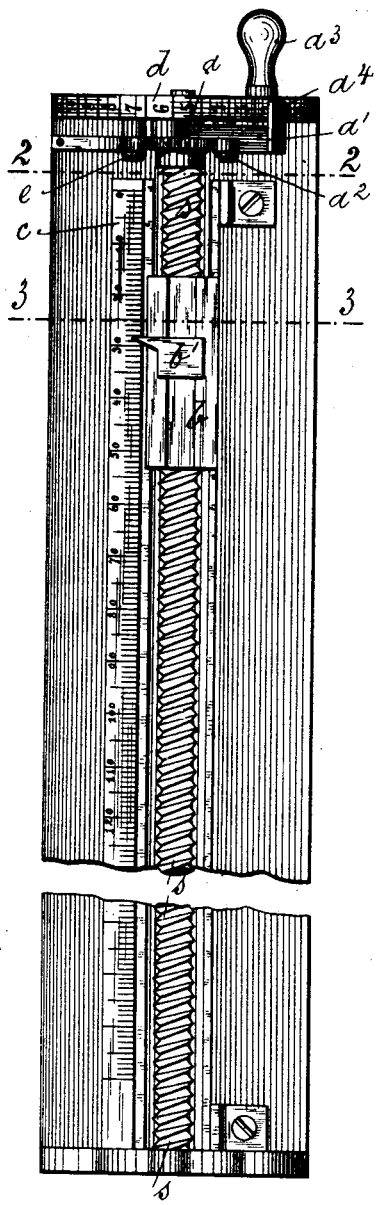
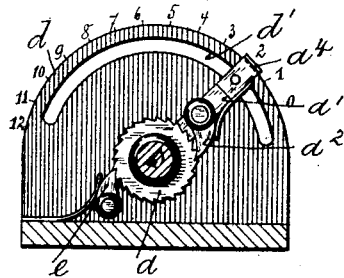
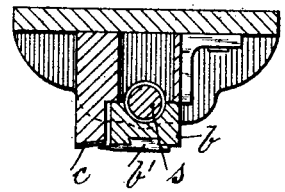
WITNESSES:
INVENTOR:

UNITED STATES PATENT OFFICE.

HEINRICH HAGEMANN, OF BERLIN, GERMANY.

INSTRUMENT FOR TRANSFERRING MEASUREMENTS ACCORDING TO ONE SYSTEM INTO ANOTHER SYSTEM.

SPECIFICATION forming part of Letters Patent No. 426,010, dated April 22, 1890.

Application filed May 5, 1887. Serial No. 237,241. (No model.) Patented in England April 22, 1887, No. 5,893; in Germany May 24, 1887, No. 41,880; in France June 3, 1887, No. 183,989; in Sweden June 3, 1887, No. 1,059; in Belgium June 6, 1887, No. 77,722; in Norway June 6, 1887, No. 577, and in Austria-Hungary December 9, 1887, No. 21,576 and No. 58,203.

*To all whom it may concern:*

Be it known that I, HEINRICH HAGEMANN, of the city of Berlin, Germany, have invented certain new and useful Improvements in Instruments for Transferring Measurements Made According to One System into Another System, (for which patents have been granted in Germany, No. 41,880, dated May 24, 1887; in England, No. 5,893, dated April 22, 1887; in France, No. 183,989, dated June 3, 1887; in Belgium, No. 77,722, dated June 6, 1887; in Sweden, No. 1,059, dated June 3, 1887; in Norway, No. 577, dated June 6, 1887, and in Austria-Hungary, No. 21,576 and No. 58,203, dated December 9, 1887,) of which the following is a specification.

My invention relates to the class of mathematical instruments designed to lessen the labor of calculation, such as calculating and adding machines; and its object is to provide an instrument containing two indexes or movable pointers geared together in such a manner that when one index is moved over a given space on a scale, which space represents one or more units of some system of measurement, the other index will move over a series of graduations on a scale which will express by their number in another system the distance the first index has moved. For example, if the first index be moved over, say, ten of a series of graduation-marks on a scale, each of which represents one typographical unit, the second index may be made to move simultaneously over a number of graduation-marks on another scale representing millimeters, and to indicate on this metrical scale the number of millimeters comprised in ten typographical units of measurement. Of course any other two systems of measurement may be employed, and the actual graduations themselves may be arbitrarily spaced, so long as they bear the proper relations to each other and to the connecting gearing or mechanism, whereby the primary index imparts motion to the secondary.

My invention will be fully described hereinafter, and its novel features carefully defined in the claims.

In the accompanying drawings, which serve to illustrate my invention, I have shown my invention embodied in a simple instrument which is adapted for adding up measurements taken in typographical units and expressing the sum of said measurements in units of the metric system.

Figure 1 is a front view of the instrument, which is shown broken across merely to indicate that it may be of any length desired. Figs. 2 and 3 are transverse sections of the instrument, taken, respectively, in the planes indicated by lines 2 2 and 3 3 in Fig. 1.

In a suitable frame is rotatively mounted a screw $s$, having the proper or desired pitch, and on this screw is fixed a ratchet-wheel $a$. A radial arm $a'$ is mounted to swing loosely on the journal of the screw $s$, and this arm carries a spring-pawl $a^2$, which engages the teeth of said ratchet-wheel and serves to rotate said screw $s$ when the said arm is moved forward. A stop-pawl $e$, mounted on the frame in which the screw is journaled, also meshes with the teeth of the ratchet-wheel and prevents backward rotation of the screw. The end of the frame of the instrument is curved concentric with the axis of the screw $s$, and on its edge are placed equally-spaced graduation-marks $d$, which are numbered consecutively, as shown, and form a primary scale. These graduation-marks $d$ correspond in spacing to the teeth on the ratchet-wheel $a$—that is to say, any ten degrees (for example) of the periphery of the ratchet-wheel will contain as many teeth as there are graduation-marks $d$ in ten degrees of the periphery of the rounded or convex part of the instrument bearing said graduations. The radial arm $a'$ has an index or pointer $a^4$, which, when the arm swings, plays or moves over the primary scale. This I call the "primary index." The arm is also provided with an operating-handle $a^3$, the shank of which passes through and plays in a curved slot $d'$ in the frame of the instrument, thus forming a guide to steady the arm in its movements.

In suitable guides in the frame of the instrument is mounted a slide $b$, which has screw-threads which engage the threads on the screw $s$, whereby said slide is caused to move along its guides lengthwise of the screw by the rotation of the latter. This slide is made in the form of a half-nut, and is so mounted that it may be conveniently removed from its guides and set at any point desired on the screw.

An index or pointer $b'$ is mounted on the slide $b$, usually in a dovetail groove in the latter, so as to be conveniently adjusted, and this secondary index is arranged to travel over a plate $c$ on the frame, on which are marked metrical graduations forming a secondary scale. Now, the pitch of the screw $s$ is such that when the primary index $a^4$ is moved over ten (for example) of the spaces of the primary scale the secondary index $b'$ will indicate on the secondary or metrical scale a space equal to ten typographical units expressed in millimeters.

If it be desired to add up and express in metrical units or fractions the sum of several numbers of typographical units—as five, four, seven, &c.—it is only necessary to set both indexes at zero, then to move index $a^4$ first to the mark 5 on the primary scale, and then back to zero; second, to move said index to the mark 4 on said scale and then back to zero, and, third, to move said index to mark 7 and then back to zero, &c. The secondary index $b'$ will then indicate on the secondary scale (on plate $c$) the length of sixteen typographical units, expressed in metrical units or fractions thereof.

It will be seen that it is not essential that the space between two graduation-marks $d$ on the primary scale shall equal a typographical unit, nor that the space between two graduation-marks on the secondary scale shall equal a metrical unit or any decimal fraction thereof; but it is essential that there shall be a known and proper relation between the two, and this relation will be governed by the character of the two systems of measurement for which the instrument is adapted, and the construction will be based on the difference of length of the units of the two systems.

Having thus described my invention, I claim—

1. In an instrument for the purpose specified, the combination, with the frame provided with the primary index-scales, both arranged substantially as shown, of the screw rotatively mounted in said frame, a ratchet-wheel mounted on and secured to said screw, an arm mounted to swing radially on the said screw and carrying the primary index, and a pawl which engages the teeth of said ratchet-wheel, the said index and pawl, a stop which prevents back rotation of the ratchet-wheel, a slide adapted to be driven by the screw in a path parallel with the screw-axis, and a secondary index carried by said slide and arranged to move along the secondary scale, substantially as set forth.

2. In an instrument for the purpose specified, the combination, with the frame provided with the primary and secondary scales, and the screw mounted rotatively in said frame, of the ratchet-wheel mounted on said screw, its stop-pawl, the swinging arm $a'$, the pawl $a^2$ on said arm and engaging said ratchet-wheel, the primary index on said arm, the slide $b$, in the form of a half-nut, mounted in guides on the frame and its screw-threads in mesh with those of the screw, and the secondary index on said slide $b$, all arranged substantially as set forth.

In witness whereof I have hereunto set my hand in the presence of two subscribing witnesses.

HEINRICH HAGEMANN.

Witnesses:
ANTHONY STEFFEN,
E. W. TONKIN.